United States Patent

[11] 3,540,471

| [72] | Inventor | Alan W. Churchill |
| | | Morristown, New Jersey |
| [21] | Appl. No. | 780,760 |
| [22] | Filed | Dec. 3, 1968 |
| [45] | Patented | Nov. 17, 1970 |
| [73] | Assignee | Automatic Switch Co. |
| | | a corporation of New York |

[54] SPEED CONTROL VALVE
2 Claims, 5 Drawing Figs.

[52] U.S. Cl. .................................................. 137/513.3,
137/599; 251/83, 251/108
[51] Int. Cl. ....................................................... F16k 15/18
[50] Field of Search .......................................... 251/82, 83,
101, 108; 137/513.3, 599, 599.2

[56] References Cited
UNITED STATES PATENTS

| 740,225 | 9/1903 | Brown | 137/599X |
| 1,242,245 | 10/1917 | Rutz | 137/599.2 |
| 2,634,947 | 4/1953 | Gardner | 137/513.3 |
| 3,395,725 | 8/1968 | Roach | 137/513.3X |

FOREIGN PATENTS

| 1,483,432 | 4/1967 | France | 137/513.3 |
| 21,965 | 12/1929 | Netherlands | 137/513.3 |

Primary Examiner—Robert G. Nilson
Attorney—Breitenfeld and Levine

ABSTRACT: Valve body has two ports and orifice between the ports surrounded by a valve seat. Valve member spring-urged against valve seat, but movable away from seat to permit free fluid flow in one direction. Valve member hollow and has lateral openings through which fluid flows in opposite direction through valve. Valve member slidably guided on stem selectively positionable to regulate fluid flow through lateral opening in valve member. Stem may abut valve member to prevent flow in both directions. Knob secured to stem carries lever for locking stem in any selected position of adjustment.

Patented Nov. 17, 1970

3,540,471

INVENTOR:
ALAN W. CHURCHILL

BY Breitenfeld & Levine

ATTORNEYS

SPEED CONTROL VALVE

This invention relates to valves, and more particularly to speed control valves which permit free flow of fluid in one direction, and regulated flow in the other.

Speed control valves are usually employed with fluid power devices, such as hydraulic or pneumatic cylinders, these valves being arranged between the cylinder and the main valves, e.g., solenoid-operated valves, which control fluid flow to the cylinder. Thus, a speed control valve may regulate the flow of working fluid to a cylinder, to control the speed of movement of the piston, but allow free flow of the exhaust fluid to permit full speed return of the piston. If a speed control valve is employed in both lines of a double acting cylinder, or if two such valves are employed in the line of a single acting cylinder, the speed of movement of the piston in both directions can be controlled.

Conventional speed control valves include two parallel passageways, one of which is furnished with a check valve to allow free flow in one direction, but prevent flow in the other direction. The other passageway is provided with a tapered needle, sleeve, or other device to regulate fluid flow through it in both directions. Thus, the check valve may be arranged to allow free flow away from the cylinder, but flow toward the cylinder must pass through the passageway having the regulating device, whereby its speed is controlled.

It is an object of the present invention to provide a speed control valve of far simpler construction than those previously used, and consequently easier and less expensive to produce.

It is another object of the invention to provide such a valve requiring fewer seals than conventional speed control valves.

It is a further object of the invention to provide a speed control valve capable of blocking flow through it in both directions, when desired.

It is an additional feature of the invention to provide a speed control valve which upon visual inspection renders an indication of whether its flow regulator is locked in position.

To achieve these objectives, the invention provides a valve body, which may be a standard body used for other types of valves, having two ports and an orifice, surrounded by a valve seat, between the ports. A valve member, slidable toward and away from the valve seat, is urged against the seat by a spring. The valve member is pushed off the seat, against the spring force, to allow free flow of fluid through the valve in one direction. Flow in the other direction takes place through a passageway formed in the valve member, while the valve member is seated. A flow regulator member, which also serves to guide the movements of the valve member, may be selectively positioned to restrict the flow through the passageway to a greater or lesser extent. A knob secured to the regulator permits manual adjustment of it. The knob is formed at least in part of resilient material, and carries a lever which in one position presses the knob against the valve bonnet to lock the regulator in place, and in another position releases the pressure to permit adjustment of the regulator.

Additional features and advantages of the invention will be apparent from the following description in which reference is made to the accompanying drawings.

Figure 1:
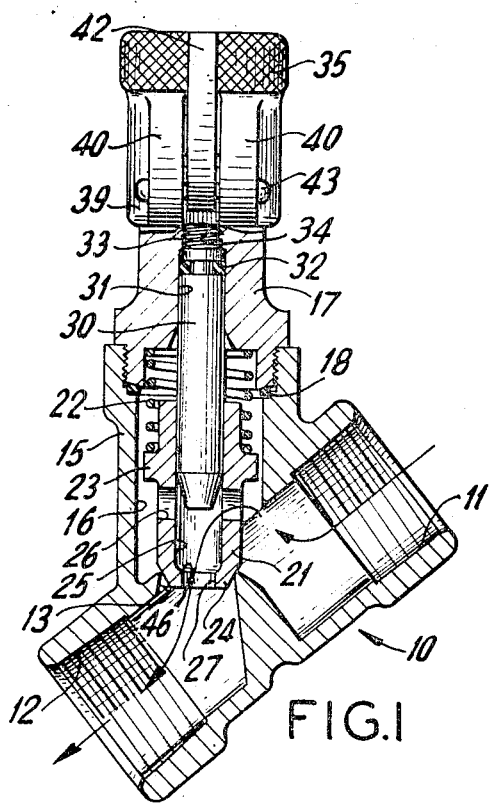
FIG. 1 is a vertical cross-sectional view of a speed control valve according to this invention, the adjusting knob being shown in elevation, during maximum possible flow in the regulated-flow direction.

The valve chosen to illustrate the present invention includes a valve body 10 having two ports 11 and 12 and an internal orifice 13 between the ports, the orifice being surrounded by a valve seat 14. The ports 11 and 12 may be internally threaded for connection to fluid-carrying conduits. The valve body portion 15 defines a chamber 16 aligned with the orifice 13, and the upper end of the chamber is threaded to accommodate the inner end of a bonnet 17. A seal 18 insures a fluid tight relationship between the bonnet 17 and valve body 10.

Slidably arranged within the chamber 16 is a valve member 21 tapered at its lower end 24 for cooperation with the valve seat 14. The valve member 21 is urged into engagement with the valve seat by a compression spring 22 which seats at one end against the upper wall of the chamber 16, and at the other end against a flange 23 projecting outwardly from the valve member. The valve member 21 has an axial bore 25 making its interior hollow, the bore extending to the upper end of the valve member, but terminating short of its lower end 24. Flow passageway means through the valve member is defined by one or more lateral openings 26 in the valve member wall between its ends, the lower region of the bore 25, and an opening 27 at its lower end 24.

Movement of the valve member 21 toward and away from the valve seat 14 is guided by a flow regulator member 30, which in the present example is in the form of a rodlike stem having a tapered lower end. The upper portion of the stem 30 is slidably and rotatably arranged within a bore 31 in the bonnet 17. An O-ring 32 is located within an annular groove near the upper end of the stem, the O-ring pressing radially outwardly against the wall of the bore 31 to provide a seal between the stem 30 and bonnet 17. The O-ring of course moves with the stem, and thus maintains the sealing relationship regardless of the position of the stem 30 within the bore 31.

Figure 5:
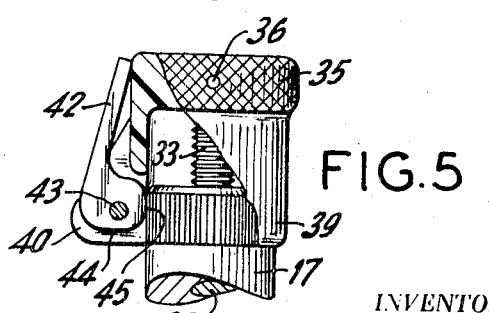
FIG. 5 is a view, partially in cross section, of the adjustment knob.

A threaded stud 33, which may be integral with the stem 30, is fixed to the upper end of the stem in axial alignment with it. The stud is accommodated within a threaded upper portion 34 of the bore 31. The upper end of the stud 33 projects above the top of the bonnet 17, and is secured to a knob 35, preferably formed of a suitable plastic material. The securement is effected by means of a pin 36 (FIGS. 3 and 5) extending through the knob 35 and a hole in the stud 33. Thus, manual rotation of the knob 35 is transmitted to the stem 30 via the stud 33, and such rotation causes axial movement of the stem.

The depending skirt portion 39 of the knob 35 surrounds the preferably knurled upper end of the bonnet 17. Two integral, spaced-apart tabs 40 project from the knob, and between the tabs the skirt 39 is cut away (see FIG. 5) to expose the bonnet. A locking lever 42 is pivotally supported between the tabs 40 on a pin 43. In the region of the pin, the lever is formed with a cam portion defining a surface 44 spaced relatively close to the axis of pin 43, and a surface 45 spaced farther from the pin axis. It will be seen that when the lever is in the position shown in FIGS. 1 and 5, the surface 45 engages the bonnet 17 and thereby pulls the far region of the knob skirt 39 against the bonnet and prevents rotation of the knob, and hence the stem 30, due to vibrations or accidental impact against the knob. On the other hand, if the lever is flipped in counterclockwise direction in FIG. 5, bringing the surface 44 adjacent to the bonnet, the pressure between the bonnet and knob skirt is relieved and the knob may be freely rotated to adjust the position of the stem 30.

In FIG. 1, the stem is shown in its uppermost position. As a result, maximum fluid flow in the regulated-flow direction through the valve, indicated by the arrows, takes place. The fluid flows into port 11, then through opening or openings, 26, bore 25, and opening 27 and exits through port 12.

Figure 2:
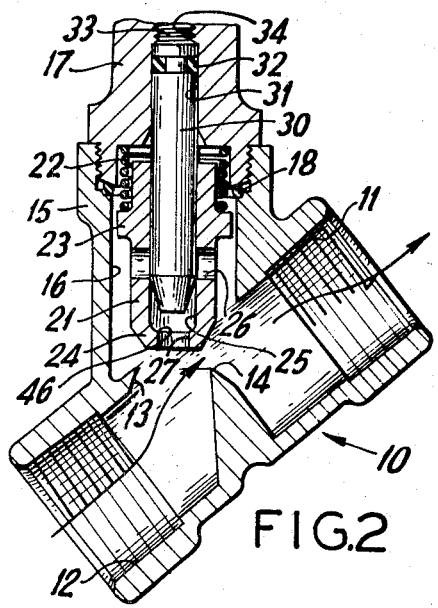
FIG. 2 is a view similar to FIG. 1 during flow in the free flow direction.

The stem 30 is in the same position in FIG. 2 as in FIG. 1, but fluid flow in FIG. 2, indicated by the arrows, is in the freeflow direction. It will be seen that the fluid pressure slides the valve member 21 upwardly along stem 30, and against the force of spring 22, to unseat the valve member and permit free flow through the orifice 13.

If it is desired to reduce the flow through the valve in the regulated-flow direction, the knob 35 is rotated so as to move the stem 30 downwardly. As this movement continues, the stem progressively reduces the flow area through the openings 26, thereby reducing flow in the regulated-flow direction. Thus, the stem can be positioned so that the precise regulated flow desired is achieved. At the same time, upward movement of the valve member 21, along the stem 30, is not restricted, and hence full flow in the free-flow direction can take place.

Figure 3:
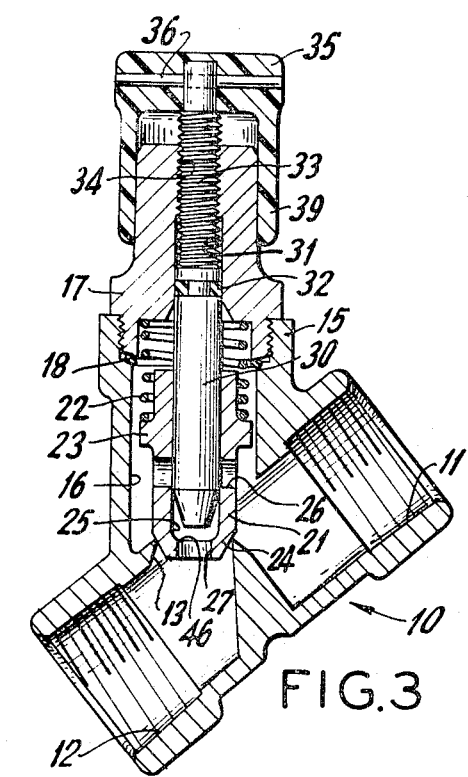
FIG. 3 is a view similar to FIG. 1, but the adjusting knob being shown in cross section, with the flow regulator blocking flow in the regulated flow direction but permitting full flow in the free flow direction.

Upon continued rotation of the knob 35, the stem 30 can be brought to the position shown in FIG. 3, wherein it completely blocks all flow through the openings 26. Consequently, no flow can take place through the valve in the regulated-flow direction. However, since the valve member is able to move away from the valve seat 14, full flow in the free-flow direction can occur through the orifice 13.

Figure 4:
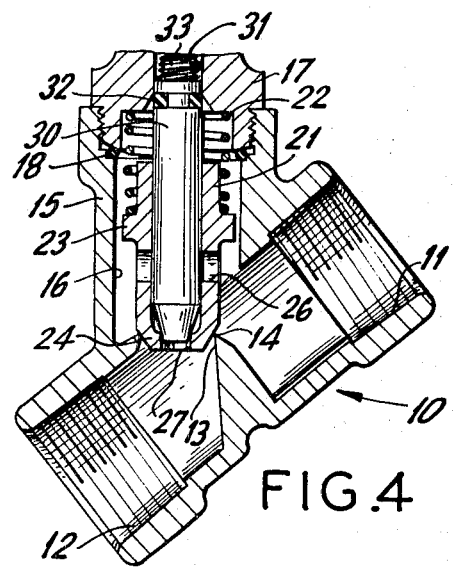
FIG. 4 is a fragmentary view of a portion of FIG. 1 showing the flow regulator blocking flow in both directions.

When the stem 30 is moved to its lowermost position, shown in FIG. 4, the lower end of the stem engages the abutment defined by the inner edge 46 of the opening 27 in the valve member. As a result, the valve member 21 cannot move upwardly away from the valve seat, and hence no flow can take place in the free-flow direction. Of course, since the openings 26, as well as the opening 27, are blocked by the stem, no flow takes place in the regulated-flow direction either.

It will be appreciated that the present speed control valve permits the widest range of adjustment, from full flow in both directions through no flow in either direction. Also, since the valve member 21 and flow regulator stem 30 are coaxial, the need for dual passageways found in conventional speed control valves is eliminated, and only a single bonnet and seal are required to contain the medium being handled.

The invention has been shown and described in preferred form only, and by way of example, and it is understood, therefore, that many variations may be made in the invention which will still be comprised within its spirit.

I claim:

1. A speed control valve for permitting free flow of a fluid in a free-flow direction through the valve, and for regulating the fluid flow in a regulated-flow direction through the valve, comprising:

a valve body having two ports and an orifice between said ports, said orifice being surrounded by a valve seat;

a bonnet fixed to said valve body;

a valve member slidably arranged within said body for movement toward and away from said valve seat;

resilient means urging said valve member into engagement with said valve seat, said valve member being moveable away from said valve seat against the force of said resilient means to permit free fluid flow in said free-flow direction between said ports;

passageway means including a lateral opening in said valve member for permitting fluid flow in the other direction between said ports;

manually adjustable means for selectively varying the size of the flow path defined by said passageway means for regulating the speed of fluid flow therethrough in said regulated-flow direction, said varying means including a regulator member for guiding the movement of said valve member, said regulator member being carried by but rotatable with respect to said bonnet;

means for retaining said regulator member in any of a plurality of selected positions, said regulator member serving to restrict fluid flow through said lateral opening to a degree dependent upon its position of adjustment;

said manually adjustable means including a manually movable part secured to said regulator member and by means of which said regulator member is rotated to change its position of adjustment; and said retaining means including a resilient portion of said movable part adjacent to the exterior of said bonnet, and means carried by said part for alternatively pressing said resilient portion against the exterior of said bonnet to lock said regulator member against rotation, or relieving the pressure between said resilient portion and bonnet to permit rotation of said part and regulator member.

2. A speed control valve as defined in claim 1 wherein said manually movable part is a knob of resilient material surrounding at least a part of said bonnet, and said pressing means is a lever pivotally carried by said knob, said lever having two surfaces adapted to engage said bonnet, one of said surfaces being spaced farther from the pivot axis of said lever that the other.